US008719291B2

(12) United States Patent
Gatterbauer et al.

(10) Patent No.: US 8,719,291 B2
(45) Date of Patent: May 6, 2014

(54) INFORMATION EXTRACTION USING SPATIAL REASONING ON THE CSS2 VISUAL BOX MODEL

(75) Inventors: Wolfgang Gatterbauer, Seattle, WA (US); Bernhard Kruepl, Vienna (AT); Paul Bohunsky, Vienna (AT); Marcus Herzog, Vienna (AT)

(73) Assignee: Lixto Software GmbH, Vienna (AT)

( * ) Notice: Subject to any disclaimer, the term of this patent is extended or adjusted under 35 U.S.C. 154(b) by 450 days.

(21) Appl. No.: 12/108,879

(22) Filed: Apr. 24, 2008

(65) Prior Publication Data

US 2008/0294679 A1 Nov. 27, 2008

Related U.S. Application Data

(60) Provisional application No. 60/913,797, filed on Apr. 24, 2007.

(51) Int. Cl.
*G06F 7/00* (2006.01)
*G06F 17/30* (2006.01)

(52) U.S. Cl.
USPC ........... 707/760; 707/802; 707/803; 707/805; 707/809

(58) Field of Classification Search
None
See application file for complete search history.

(56) References Cited

U.S. PATENT DOCUMENTS

| 7,461,340 | B1 * | 12/2008 | Mauceri et al. | 715/243 |
| 2005/0022115 | A1 * | 1/2005 | Baumgartner et al. | 715/513 |
| 2008/0098300 | A1 * | 4/2008 | Corrales et al. | 715/243 |
| 2010/0107055 | A1 * | 4/2010 | Orelind et al. | 715/234 |

* cited by examiner

*Primary Examiner* — Sherief Badawi
*Assistant Examiner* — Loan T Nguyen
(74) *Attorney, Agent, or Firm* — Sughrue Mion, PLLC

(57) ABSTRACT

A method for extracting tabular information from a web source by determining a plurality of coordinates for a plurality of visualized element nodes on the web source; determining a subset of the plurality of visualized element nodes based on the plurality of coordinates to obtain a candidate web table, wherein each of the subset of the plurality of visualized element nodes constitutes a logical cell of the candidate web table; determining textual content corresponding to the subset of the plurality of visualized element nodes as the textual content would appear after rendering the web source in a browser; and transforming the candidate web table into an explicit representation of relative spatial relation between at least one of the logical cell; and saving the explicit representation in a structured document format.

3 Claims, 12 Drawing Sheets

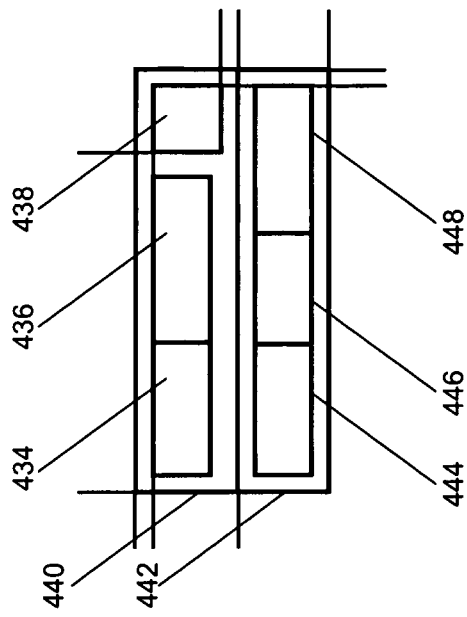
Fig. 4B
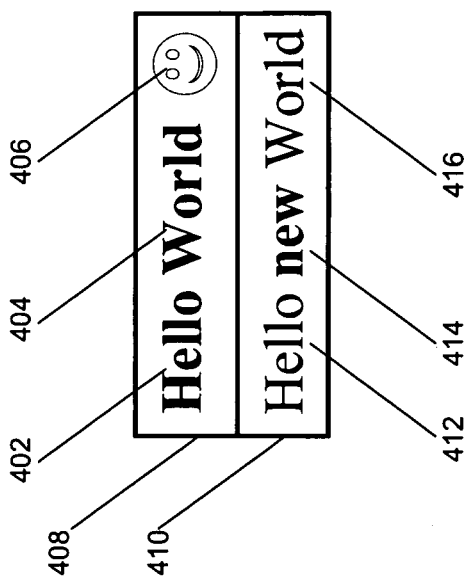
Fig. 4A
Fig. 4

INFORMATION EXTRACTION USING SPATIAL REASONING ON THE CSS2 VISUAL BOX MODEL

CROSS-REFERENCE TO RELATED APPLICATIONS

This application claims the benefit of U.S. provisional patent application Ser. No. 60/913,797, filed Apr. 24, 2007 by the present inventors.

BACKGROUND OF THE INVENTION

Tables and other spatially structured information on web pages contain a huge amount of visually explicit information, which makes them a worthwhile target for automatic information extraction and knowledge acquisition. Such web tables are easily discernable by human users by just looking at a rendered web page.

In contrast, the task of automatically extracting such information from web pages is difficult, because of HTML's design purpose to convey visual instead of semantic information. HTML does not explicitly contain the information in a way that is understandable to programs. Also, a multitude of different HTML implementations of web tables make it difficult to develop accurate and exhaustive rules to detect arbitrary web tables reliably.

Table extraction and interpretation are required by users that are interested in understanding the contents of a document. Other approaches included analysis of images of scanned documents, approximately calculating bounding boxes of objects, grouping in different classes and reconstructing the original intention of the author. Approaches to table extraction can be divided into two categories: top-down like [Nagy and Seth, 1984] and bottom-up like [Kieninger, 1998], depending on where the algorithms start. These approaches have the difficulty that the positional coordinates of individual boxes in the visual representation of the document are not deterministic and uniquely defined.

Known methods for extracting tables from web pages have focused on analyzing the source code of web pages. Penn et al. [Penn et al., 2001] defined genuine uses of HTML tables as document entities where the 2-D grid is semantically significant and described a couple of heuristics to distinguish genuine from non-genuine leaf <table> tables on web pages. Yalin Wang and Hu [Wang and Hu, 2002] trained a classifier on content features of individual cells and non-text layout features from the HTML source to perform the same task of table location. Chen et al. [Chen et al., 2000] employed heuristic rules to filter out non-genuine tables from their test set and make assumptions about cell content similarity for table recognition and interpretation. The method relied on the hierarchical HTML tag structure of the documents, most notably that of <table> tags. Yang and Luk [Yang and Luk, 2002] described how they extracted attribute-value pairs from 1-D or 2-D tables. Yoshida et al. [Yoshida et al., 2001] based their work on a general knowledge ontology and employed an expectation maximization algorithm to distinguish between attribute and value cells. They assumed that tables do no contain any spanned cells. Tengli et al. [Tengli et al., 2004] presented an algorithm that extracts tables and differentiates between label and data cells.

All these approaches have in common that they assume that relevant tables only appear inside leaf tables, which are such <table> tags that do not contain other nested <table> tags. In contrast, Lerman et al. [Lerman et al., 2004] mentioned that just a fraction of tables are actually created with <table> tags.

In their algorithm, they leveraged the list page-detail page structure present in some websites to find boundaries between records in what the current inventor would classify as a sub-structured 1-D list. They also mentioned that layout is important for table extraction, but go on to say that this means that records are separated by HTML tags.

However, none of the existing approaches provide a way to locate, extract and interpret tables from arbitrarily formatted web pages. What is needed in the arts is a way to recognize tables on web pages similar to the way human observers do, by looking at the visual representation. In contrast, we base our information extraction on positional information that is independent of the HTML tag structure and do not rely on particular HTML structures being present.

Others have explored analyzing the visual representation of web pages for web page segmentation, web form understanding and as additional source for web information extraction.

Yang and Zhang [Yang and Zhang, 2001] described an approach which derives features directly from the layout of web pages. By using a "pseudo rendering process" they try to detect "visual similarities" of HTML content objects. Gu et al. [Gu et al., 2002] described a top-down approach to segment a web page and detect its content structure by dividing and merging blocks. Kovacevic et al. [Kovacevic et al, 2002a/ Kovacevic et al, 2002b/Kovacevic et al, 2003/Kovacevic et al, 2004] used visual information to build up a "M-tree", a concept similar to the DOM tree enhanced with screen coordinates. They then use further defined heuristics to recognize common page areas such as header, left and right menu, footer and center of a page. Cai et al. [Cai et al, 2003/Yu et al, 2003/Cai et al, 2003a/Cai et al, 2003b/US RPA 2005-0028077/US RPA 2006-0106798] described a web page segmentation process that uses visual information from Internet Explorer. Their VIPS algorithm segments a DOM tree based on visual cues retrieved from the browser's rendition. Cosulschi et al. [Cosulschi et al., 2004] described an approach that uses positional information of DOM tree elements to calculate block correspondence between web pages.

In information extraction literature, Zhao et al. [Zhao et al., 2005], Zhai and Liu [Zhai and Liu, 2005] and Simon and Lausen [Simon and Lausen, 2005] independently described approaches for detecting repetitive patterns (record boundary detection) on web pages. All these three approaches are dominantly source-code based and enhanced with visual cues. In contrast, Rosenfeld et al. [Rosenfeld et al, 2002/Rosenfeld et al, 2002/Aumann et al, 2006] described a system that works only on a hierarchical structure of the visual representation and learns to recognize text fields such as author or title from manually tagged training sets of documents. In contrast, our approach does not attempt to find individual text fields, but rather, larger structures, does not require training sets and neither imposes a hierarchical tree structure on the overall web page.

Cohen et al. [Cohen et al., 2002] mentioned "rendering" HTML code and using the results for detecting relational information in web tables. Their approach, however, does not actually render web pages, but rather infers relative positional information of table nodes in an abstract table model with relative positional information deduced from the source code. Nor does it mention the idea of using the calculated metadata information from rendering for interpretation. Nor does it observe that much metadata information is contained in word or text boxes, which are not physically existing as separate boxes in the DOM tree. In contrast, in [Kruepl et al., 2005] described a top-down web table location mechanism working exclusively on visual information obtained from the Mozilla web browser. The approach worked on word bounding boxes after manipulation of the DOM tree. Tables were detected by first determining these visualized words and then grouping them together with the help of space density graphs and recursive application of an existing the X-Y cut algorithm. This approach was later adapted in [Kruepl and Herzog, 2006] to a bottom-up clustering algorithm starting with word bounding boxes as well. The problem with this approach is that it has difficulties with deducing the individual logical cells of tables and their relative logical relation between each other (the logical table model). Also, visual metadata information visible to the human observer such as background colors which is relevant for interpreting tables, is lost in the process.

None of the existing approaches provide a way to locate, extract and interpret tables from arbitrarily formatted web pages.

None of the existing approaches eliminate some of the difficulties of clearly recognizing the individual units of tables and respective relation to each other. And at the same time, none of the existing approaches provide a way to retrieve metadata information of text (like bold, size 14) which allows interpreting the reading order and as such the information contained in web tables.

SUMMARY OF THE INVENTION

What is disclosed is a system and method to locate, recognize, extract and interpret information contained in web tables or other spatially structured data.

In one aspect the disclosure provides a method for extracting tabular information from a web source by determining a plurality of coordinates for a plurality of visualized element nodes on the web source; determining a subset of the plurality of visualized element nodes based on the plurality of coordinates thus obtaining a candidate web table, wherein each of the subset of the plurality of visualized element nodes constitutes a logical cell of the candidate web table; determining textual content corresponding to the subset of the plurality of visualized element nodes as the textual content would appear after rendering the web source in a browser; and transforming the candidate web table into an explicit representation of relative spatial relation between at least one of the logical cell, thereby providing said tabular information from said web source and saving the explicit representation in a structured document format.

In one aspect the method for extracting tabular information from a web source includes determining a plurality of coordinates for a plurality of visualized element nodes on the web source; determining a textual content corresponding to the visualized element nodes as the textual content would appear after rendering the web source in a browser; determining at least one subset of the plurality of visualized element nodes, wherein each visualized element node constitutes a logical cell of a candidate web table and each subset of the plurality of visualized element nodes a candidate web table; and transforming the plurality of candidate web tables into an explicit representation of the relative spatial relations between the logical units of the candidate web tables, whereby tabular information from the web source is available for displaying or saving in an explicit form. Explicit form means that the information contained in the tabular structure is available to further machine processing.

In one aspect the method provides for efficiently indexing and deducing relative spatial relations between highly aligned visualized boxes on a web page by rendering the web page; identifying a plurality of visualized boxes; indexing four coordinates of four individual visualized element nodes corresponding to each individual visualized box to extract a data structure; using said data structure to deduce neighbor relations between said four individual visualized element nodes, whereby the relative spatial relations between the highly aligned visualized boxes on the web page is deduced. It is to be appreciated that, while the current embodiment of the invention focuses on rectangular areas as logical elements of the table, in an alternative version, non-convex polygons can be used whose edges are either vertical or horizontal and, thus, aligned to the 4 directions of the visual plane.

In one aspect the disclosure provides a system to extract tabular information from a web page including a visualized element nodes generator that generates a plurality of visualized element nodes from the web page; a textual and metadata generator that generates textual content and metadata corresponding to the plurality of visualized element nodes; a tabular structure extractor that detects candidate tabular structures in the web page; a semantically relevant table discriminator that transforms the candidate tabular structures detected by the tabular structure extractor and extracts a semantically relevant table; a web table interpreter that interprets information contained in the semantically relevant table to provide an interpreted table, whereby the tabular information is extracted from the web page.

In one aspect the disclosure provides a device for using in a computer including instructions for performing a process for extracting tabular information from a web source, wherein the process includes determining a plurality of coordinates for a plurality of visualized element nodes on the web source; determining a subset of the plurality of visualized element nodes based on the plurality of coordinates and interpreting each subset as a candidate web table, wherein each of the subset of the plurality of visualized element nodes constitutes a logical cell of the candidate web table; determining textual content corresponding to the subset of the plurality of visualized element nodes as the textual content would appear after rendering the web source in a browser; and transforming the candidate web table into an explicit representation of the contained tabular information. Explicit representation refers to a format in which the relative spatial relations between the logical cells are explicit and, thus, the contained information in the table is fully available to automatic machine processing; and saving the explicit representation in a structured document format.

Another aspect of the disclosure is a system to extract tabular information from a web page comprising: a visualized element nodes generator that generates a plurality of visualized element nodes from the web page; a textual and metadata generator that generates textual content and additional metadata corresponding to said plurality of visualized element nodes; a tabular structure extractor that detects candidate tabular structures in said web page; a semantically relevant table discriminator that transforms said candidate tabular structures detected by said tabular structure extractor and extracts a semantically relevant table; a web table interpreter that interprets information contained in said semantically relevant table to provide an interpreted table, whereby said tabular information is extracted from said web page.

Computer program product, including computer readable media comprising instructions, the instructions being capable of implementing the above methods and techniques are also part of the disclosure. For example, these could be embodied as higher level or lower level computer code, or any combinations thereof, and the computer code could be stored in any type of computer storage media, including, but not limited to RAMs, ROMs, hard disks, flash memory, floppy, CDs, magnetic tapes, etc. In addition, the techniques can be implemented in any computing environment, including, but not limited to, a stand alone computer, a network, remotely over a network, etc.

A web table is a two-dimensional presentation of logical relations between groups of data items. Those relations are reflected by different visual properties and by horizontal and vertical alignment of the data items in a visible or implied grid structure, which becomes observable to a human reader after a web page is rendered. In order to extract this information, which is not explicitly deducible from the source code description of a web page, the method makes use of relative spatial arrangement of "visualized element nodes" including their textual information as determined by the spatial boundaries on a web page together with calculated style or metadata information.

More generally, this invention describes a method to deduce semantic relations between individual pieces of data implied by their spatial arrangement on a web page and, hence, to deduce and extract information implied by combining several pieces of data, by analyzing the spatial relations between visualized element nodes.

The method can be considered an enabling technology, allowing to deduce semantic or tabular relations previously difficult to understand by previous approaches. As such, the invention can be used in several different ways to extract information from web pages and later use this information for different value-added services.

BRIEF DESCRIPTION OF THE DRAWINGS

The preferred embodiment and other aspects of the invention will become apparent from the following detailed description when taken in conjunction with the accompanying drawings which are provided for the purpose of describing the invention and not for the limitation thereof, in which:

FIG. 4A illustrates an example of how information is rendered in a web browser FIG. 4B illustrates the concepts of visualized element nodes and visualized words for this example FIG. 5 characterizes the most dominant forms of spatially structured information on the Web

DETAILED DESCRIPTION OF THE INVENTION

We provide a method to recognize tables on web pages similar to the way human observers do, by looking at the visual representation.

In [Gatterbauer and Bohunsky, 2006], we describe a method for table extraction that works on both word and element node bounding boxes, which is the basis for this RPA. In [Gatterbauer et al, 2007] we provide more examples and give a formalization of some embodiments of the method.

In contrast to other approaches, we base our information extraction on positional information that is independent of the HTML tag structure and do not rely on particular HTML structures being present. Our approach does not attempt to find individual text fields, but rather, larger structures, does not require training sets and neither imposes a hierarchical tree structure on the overall web page.

A web table is a two-dimensional presentation of logical relations between groups of data items. Those relations are reflected by different visual properties and by horizontal and vertical alignment of the data items in a visible or implied grid structure, which becomes observable to a human reader after a web page is rendered. In order to extract this information, which is not explicitly deducible from the source code description of a web page, the method makes use of relative spatial arrangement of "visualized element nodes" including their textual information as determined by the spatial boundaries on a web page together with calculated style or metadata information.

More generally, this invention describes a method to deduce semantic relations between individual pieces of data implied by their spatial arrangement on a web page and, hence, to deduce and extract information implied by combining several pieces of data, by analyzing the spatial relations between visualized element nodes.

The method can be considered an enabling technology, allowing to deduce semantic or tabular relations previously difficult to understand by previous approaches. As such, the invention can be used in several different ways to extract information from web pages and later use this information for different value-added services.

Figure 5:
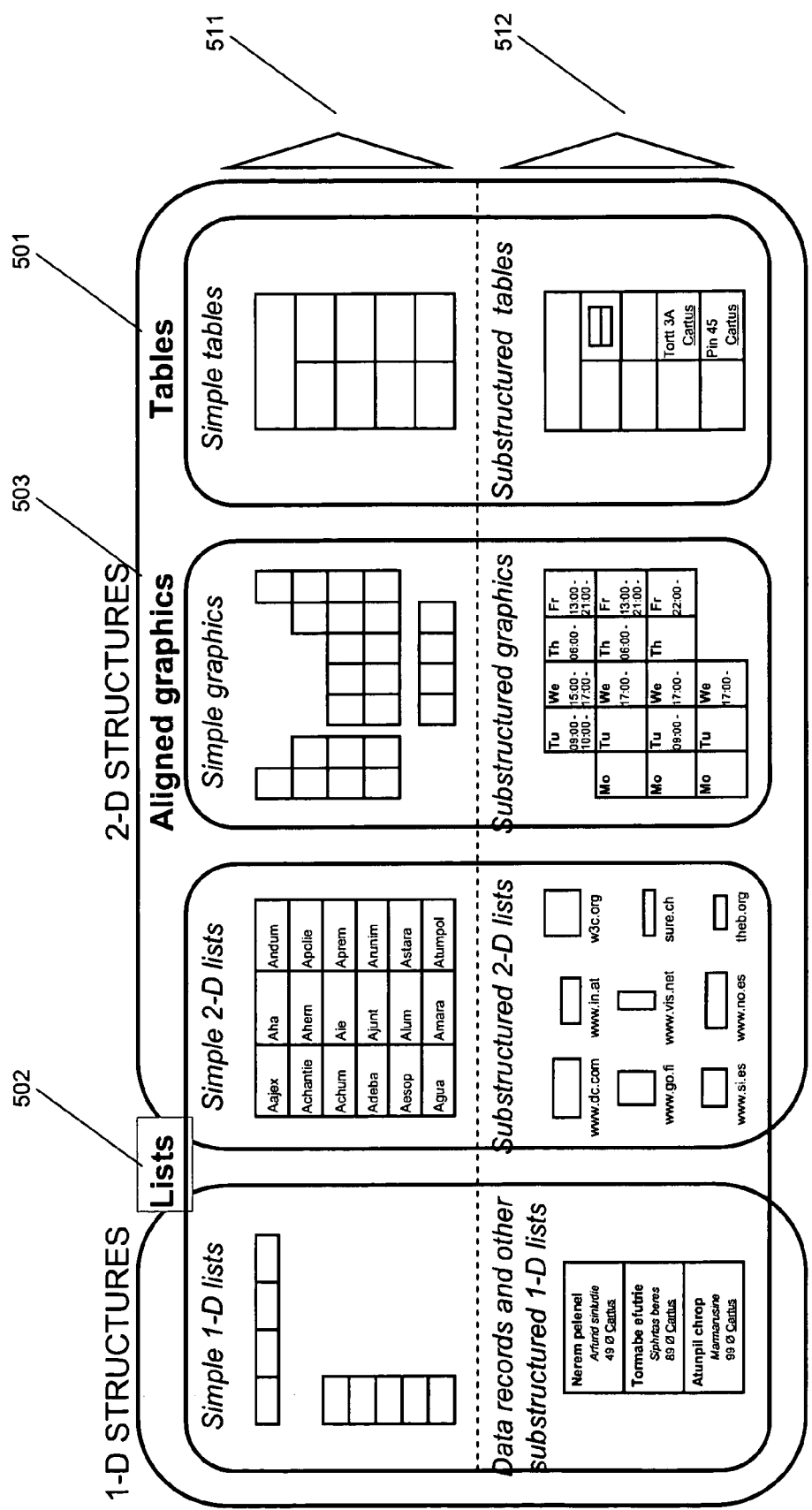

What is disclosed is a system and method to locate, recognize, extract and interpret information contained in arbitrary web tables or other spatially structured data (FIG. 5). While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modification sand alterations are included insofar as they come within the scope of the appended claims or equivalents thereof.

The discussions herein refer to documents and models used to describe the structures of the documents. Documents can be in any of a variety of formats, such as in accordance with a Standard Generalized Markup Language (SGML), such as the Extensible Markup Language (XML) format or the HyperText Markup Language (HTML) format. In certain embodiments, these documents discussed herein can be any of a variety of models that describe the structure of a document. In certain embodiments, the model used is a Document Object Model (DOM). The Document Object Model is a tree-structured representation of a document, also referred to as a DOM tree. In many of the discussions herein, the documents are described as being in the HTML format (e.g., web pages), the model is described as a DOM tree, and each HTML tag of the document is represented by a node in the DOM tree (the DOM tree may also include additional nodes, such as #text or #comment nodes, which generally may not represent an HTML tag). However, it is to be appreciated that the vision-based information extraction can also be used with these other documents and/or models.

Figure 1:
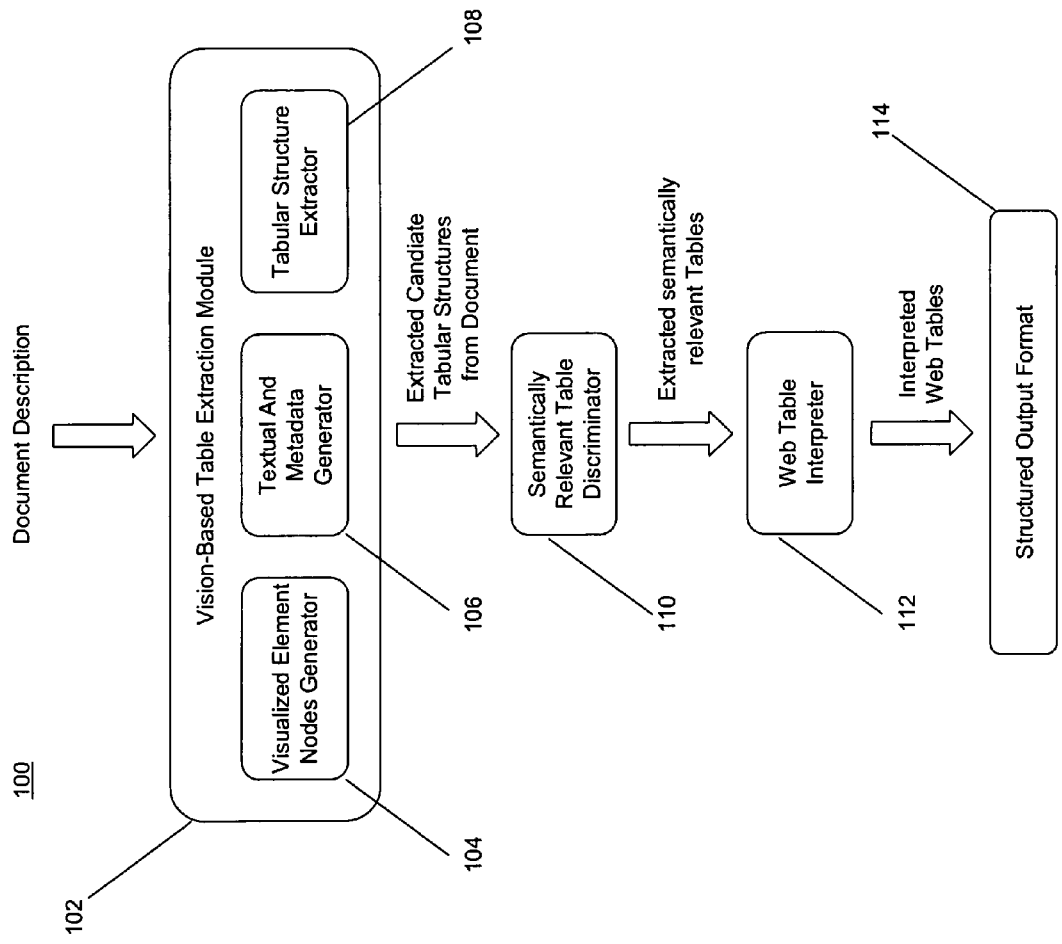
FIG. 1 is a block diagram illustrating an example system using spatial reasoning-based table extraction and interpretation.

FIG. 1 is a block diagram illustrating an example system 100 using spatial reasoning on the Visual CSS2 box model for extracting and interpreting arbitrary tables. System 100 includes a Vision-Based Table Extraction Module 102 having a Visualized Element Nodes Generator 104, a Textual And Metadata Extractor 106, and a Tabular Structure Extractor 108. A Document Description is accessible to Vision-Based Table Extractor Module 102. This Document Description is a model that describes the structure of the document, such as a DOM tree. The document description may be generated by another component (not shown) and made accessible to module 102, or alternatively the document itself may be accessible to module 102 and module 102 may generate the document description.

Visualized Element Nodes Generator 104 identifies, based on the document description, multiple visualized element nodes of the document. This identification (also referred to herein as generation) of the visualized element nodes generates a description of the spatial location and other visual properties (herein referred to as metadata), such as background color, font sizes/or types, colors of fonts of the element nodes when the document is displayed in a web browser or similar rendering engines. The identified visualized element nodes are output by module 104 and made available to Textual And Metadata Generator 106.

Textual And Metadata Generator 106 generates the textual content and additional metadata of the visualized element nodes. In the current embodiment, textual data of visualized element nodes is generated by generating spatial location and other visual properties (herein referred to as metadata), such as font sizes/or types, colors of fonts of each individual word and then using spatial reasoning to project textual content into visualized element nodes. An alternative embodiment would determine spatial location not of each word but smaller or larger units of text. An alternative embodiment would traverse the DOM tree description of the document in search for textual nodes as descendants of the respective visualized element node, which would not be as reliable, but faster. Textual content and additional metadata of textual content are output by Textual And Metadata Generator 106 and made available to Tabular Structure Extractor 108.

Tabular Structure Extractor 108 detects candidate tabular structures in the document, based on the visualized element nodes with textual and additional metadata output by module 104 and module 106. Candidate tabular structures are sets of visualized element nodes with textual and metadata information that appear as tabular structure on rendered web pages. Candidate tabular structures are output by module 108.

Semantically Relevant Table Discriminator 110 transforms or deletes candidate tabular structures output by Tabular Structure Extractor 108. Module 110 uses spatial and metadata information of visualized element nodes to discriminate between candidate tabular structures that form semantically relevant tables and irrelevant tables, and irrelevant visualized element nodes of semantically relevant tables. Semantically relevant tables are output by module 110.

Web Table Interpreter 112 interprets information contained in semantically relevant tables based on spatial and metadata information. Interpreted tables (also called instantiated schemas of tables) are output by module 112 and saved in a structured output format 114.

In the current embodiment, the structured output format is an XML file but any other structured document format can be used.

Figure 2:
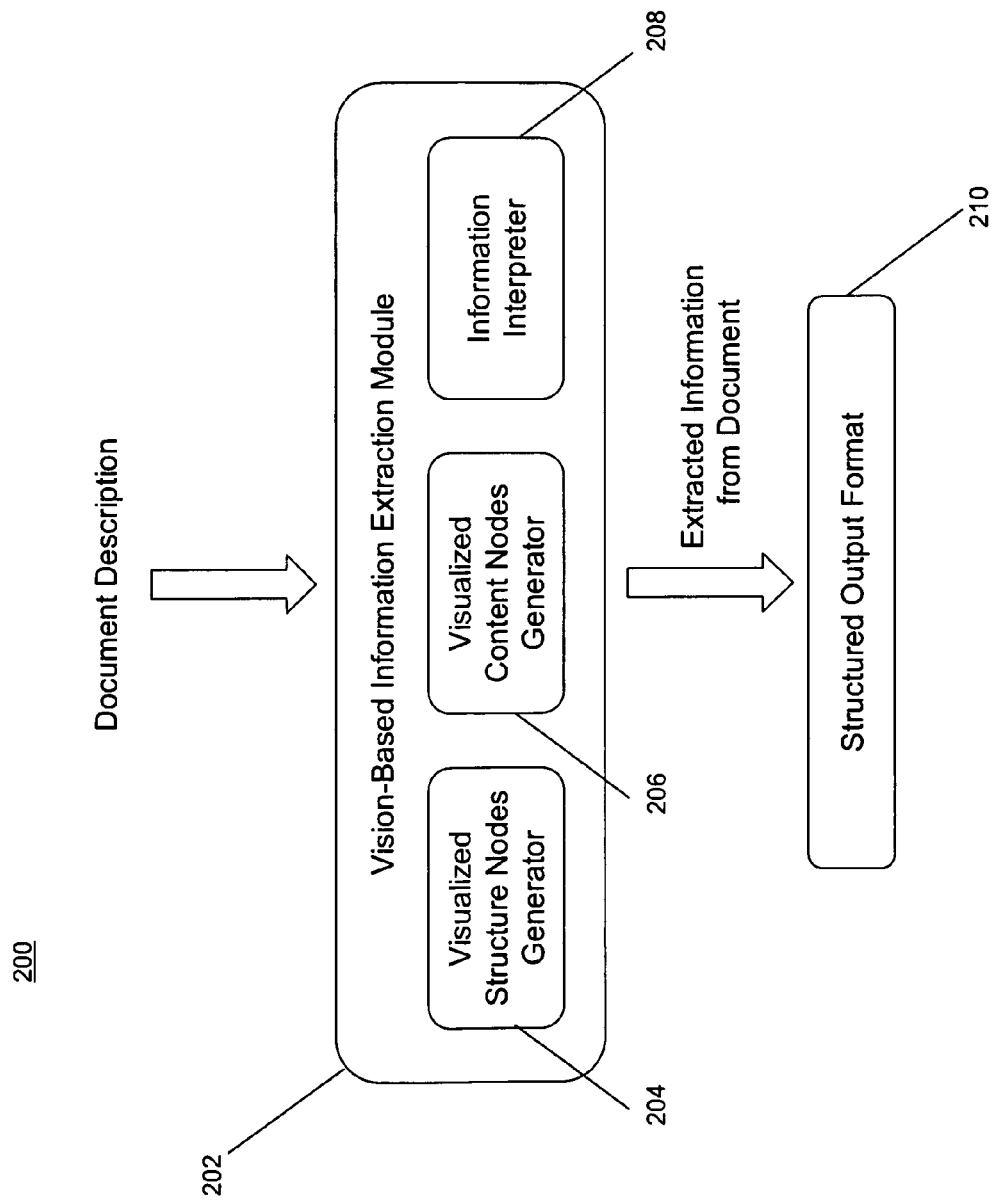
FIG. 2 is a block diagram illustrating an example system using spatial reasoning-based extraction of spatially structured data.

FIG. 2 is a block diagram illustrating an example system 200 using spatial reasoning on the Visual CSS2 box model for extracting and interpreting arbitrary spatially structured information. System 200 includes a vision-based information extraction module 202 having a Visualized Structure Nodes Generator 204, a Visualized Content Nodes Generator 206, and an Information Interpreter 208. A document description is accessible to both Visualized Structure Nodes Generator 204 and Visualized Content Nodes Generator 206. This document description is a model that describes the structure of the document, such as a DOM tree. The document description may be generated by another component (not shown) and made accessible to module 202, or alternatively the document itself may be accessible to module 202 and module 202 may generate the document description.

Visualized Structure Nodes Generator 204 identifies, based on the document description, multiple visualized element nodes of the document. This identification (also referred to herein as generation) of the visualized element nodes generates a description of the spatial location and other visual properties (herein referred to as metadata), such as background color, font sizes/or types, colors of fonts of the element nodes when the document is displayed in a web browser or similar rendering engines. The identified visualized element nodes are output by module 204 and made available to Information Interpreter 206.

Visualized Content Box Generator 206 generates the spatial and metadata information for textual content of the web document. In the current embodiment, textual data of visualized element nodes is generated by calculating spatial location and other visual properties (herein referred to as metadata), such as font sizes/or types, colors of fonts of each individual word. An alternative embodiment would determine spatial location not of each word but smaller or larger units of text. Spatial arrangement and additional metadata of Visualized Content Nodes are output by Visualized Content Node Generator 206 and made available to Information Interpreter 208.

Information Interpreter 208 detects spatially structured information in the document, based on the visualized structure nodes output by module 204 and the visualized content nodes output by module 206. Information is interpreted and extracted by analyzing spatial arrangement and metadata of visualized structure nodes and visualized content nodes. Found spatially structure information patterns are output by module 208 and saved in a structured output format 210.

In one embodiment, the structured output format is an XML file but any other structured document format can be used.

In one embodiment, no further use of information which is not derived from the visual representation is used for the extraction and interpretation. However, additional information can be alternatively derived by the analysis of other then visual features. The important contribution is that the visual representation is the basis from which other information is derived and it is not merely additional information.

The manner in which the extracted tables or other spatially structured information are used can vary. In some embodiments, the extracted tabular information is fed into a database system for further use. Additionally, in certain embodiments, the extracted tabular information may be used to rank documents in response to a query.

It should be noted that the information extraction method described herein makes use of the way a document would look when it is displayed. The method does not require that a document actually be displayed.

Figure 12:
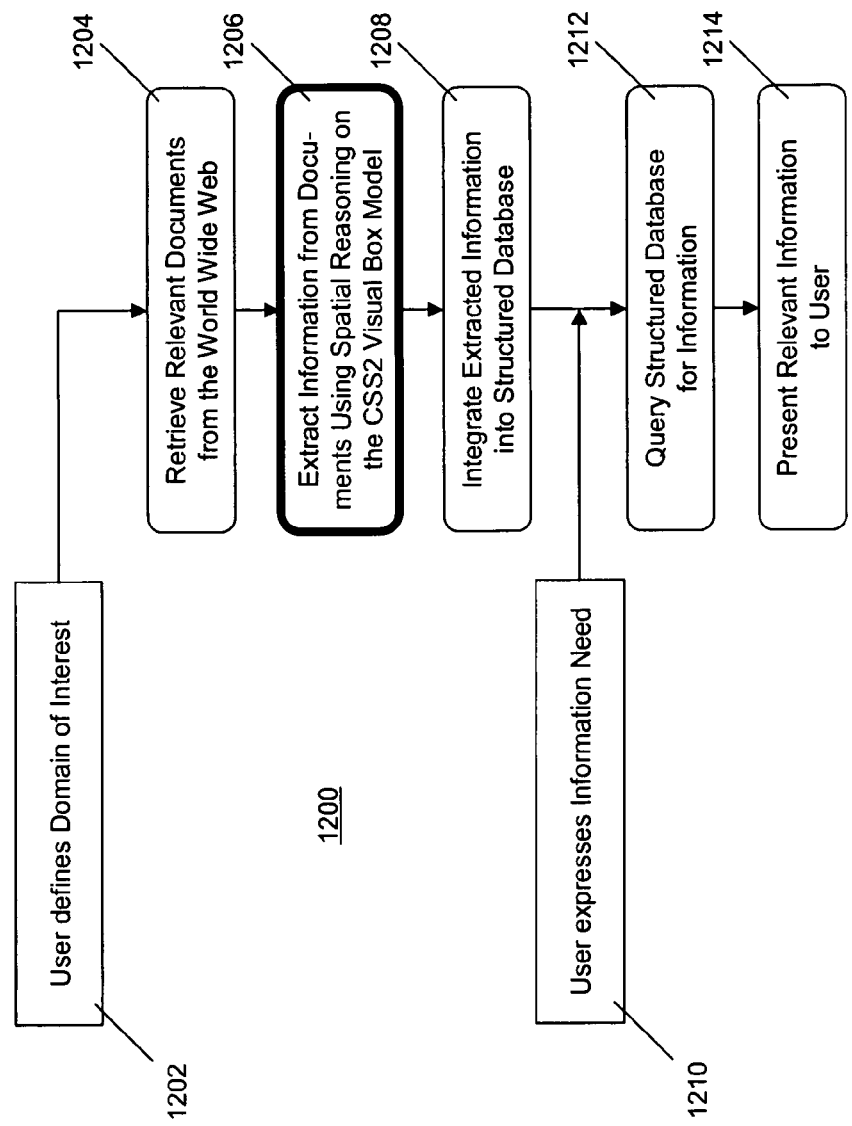
FIG. 12 is a flowchart illustrating an example web harvesting process in which the described method for information extraction is employed.

FIG. 12 is a flowchart illustrating an example web harvesting process 1200 in which the described method for information extraction (act 1206) is employed. Act 1206 is implemented by Information Extraction Using Spatial Reasoning on the CSS2 Visual Box module 100 of FIG. 1 or module 200 of FIG. 2, and may be performed in software, firmware, hardware, or combination thereof.

Initially, a user defines an area or domain of interest using an appropriate knowledge representation of this domain of interest. Such a domain of interest can be e.g. tourism or product comparison or any other area of knowledge. A process 1204 then retrieves documents from the World Wide Web as response to this definition. Process 1204 can be implemented by using Web crawlers and comparing textual content of those pages with the defined domain knowledge. Process 1206 takes retrieved document and extracts information using spatial reasoning on the CSS2 visual box model. Process 1208 takes extracted information and integrates it into a structured knowledge of database.

A user then expresses a concrete information need (act 1210). This expression can happen in the form of a structured query language for the integrated database or in the form of keywords similarly to the interface of common web search engines today. As response to the expressed information need, process 1212 queries the integrated database for relevant information. Relevant information retrieved from the integrated database is then presented to the user (act 1214). The user expressing information need in act 1210 may or may not be the same user expressing information need in act 1202.

Thus, it can be seen that the information extraction process 1206 simplifies the process of querying the World Wide Web for information. The World Wide Web uses a visual representation of the contained information. As a result, the information contained in individual web documents is difficult to understand for machine processes merely relying on the textual content of web pages. Process 1206 extracts information from the Visual Web into a representation that can be further processed by automatic processes.

It is understood that the described web harvesting process (act 1200) is stated only as one example of employing the described information extraction process (act 1206). As an example, the actual point of user involvement (acts 1202, 1210) with the web harvesting process (act 1200), and thus also, the visual information extraction process (act 1206) can vary in different embodiments of the invention.

Logical Units of Information in the Visual Web

The World Wide Web (also Web) contains many individual and heterogeneous information sources. It is also sometimes called "the visual Web", as it is this part of the Internet through which human users search for information by looking at windows of Web browser that render and show the information in a certain visual arrangement. Most of those information sources are web pages that are made up of HTML code or, increasingly, new web technologies such as CSS2, Java, Javascript, AJAX etc. Modern web browsers render this multitude of possible information encodings for the user transparently.

When HTML documents are laid out on the screen of a web browser, CSS (Cascading Style Sheets) represents the elements of the document by rectangular boxes (408, 406, 410, 440, 442, 438) that are laid out one after the other or nested inside each other in an ordering that is called a flow. Each box has a content area and optional surrounding padding, border and margin areas according to the CSS2 visual formatting model [Wium Lie et al. 1998]. Such boxes optionally contain textual information or words (402, 404, 414, 416) with varying style information We refer to such rendered or visualized element nodes as element boxes and use their border edges as our defining edges.

Our observation is that these visualized element nodes, although not always necessarily visible as such to the human observer, often form logical units of information as displayed in web browsers. This is especially so for web tables. In order to retrieve their positional information and metadata information, we access this positional information from within our program by using XPCOM bindings of the Mozilla browser. Our reason for using the Mozila browser is that writing a modern web browser adhering to all current and future standards is a very complicated task. As it is not feasible for our extraction system to re-implement all the rendering abilities of such a system, we chose to rely on the Gecko which is actively and continuously improved by a large community of developers.

Spatial Relations Between Logical Units in the Visual Web

Figure 6:
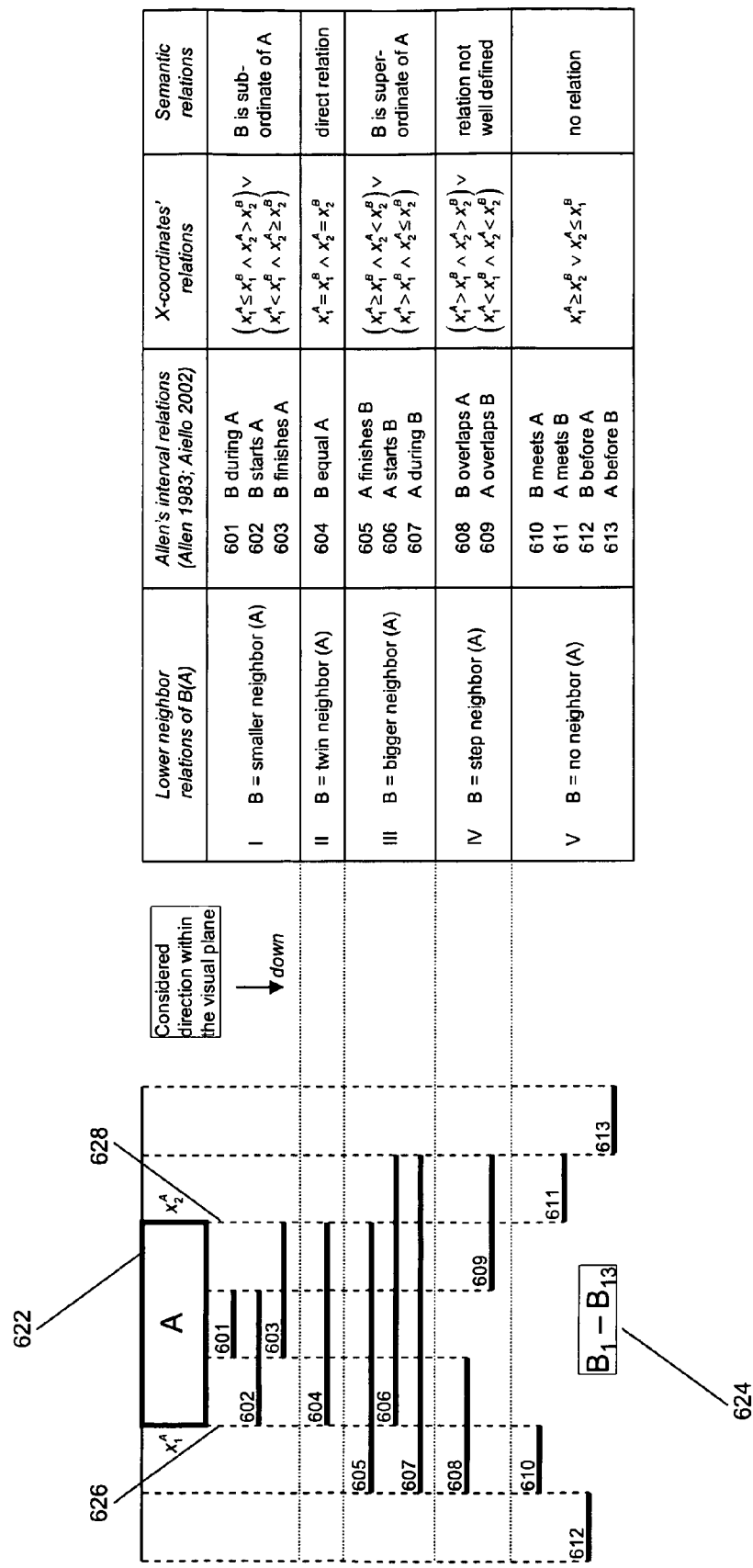
FIG. 6 illustrates the five possible spatial relations between neighboring cells in the visual box model

We use two notions to characterize the spatial relations between any two boxes on the grid both vertically and horizontally: alignment and adjacency. Alignment compares horizontal and vertical projections of boxes (FIG. 6). Aiello [Aiello, 2002] introduced rectangle relations based on the 13 temporal interval relations from Allen [Allen, 1983] together with a notion of thick boundary for the purpose of reading order detection from document images. For our purpose, clustering into 5 distinct types of neighbor relations (smaller neighbor, twin neighbor, bigger neighbor, step neighbor, no neighbor) proved useful, as they express the 5 possible spatial relations between table cells for a given direction As an example, we compare the vertical projects of the x-coordinates of two boxes A (622) and B. In total 13 possible relative spatial positions can be enumerated (601, 602, 603, 604, 605, 606, 607, 608, 609, 610, 611, 612, 613). Adjacency is a term closely related to distance. Theoretically, two cells in the grid are adjacent if they are flush with each other. In reality, however, the actual distance between adjacent boxes is not always 0 and a long list of parameters would have to be recorded and calculated in order to correctly "reverse engineer" whether any two boxes are meant to be adjacent according to the CSS2 visual box model [Wium Lie et al. 1998]. This could be done, but to avoid the resulting time performance reductions, we propose two boxes with a distance between 0 and 3 pixels to be adjacent, but any other parameter could be used. Also, alternatively, two boxes could be defined as adjacent if no other box is in between them.

Figure 3:
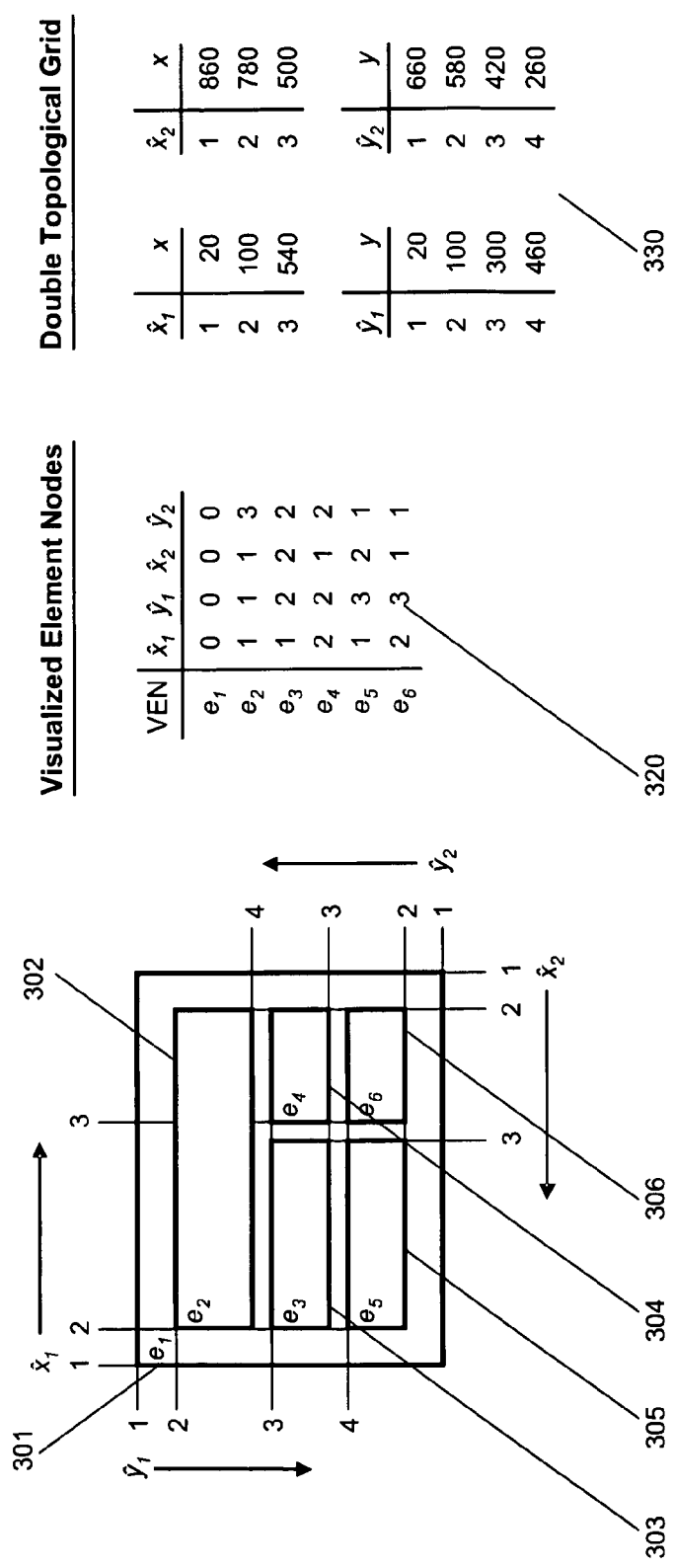
FIG. 3 illustrates the double topological grid used for indexing visualized element nodes.

FIG. 3: Given all element boxes (301, 302, 303, 304, 305, 306), we superimpose a minimal grid which covers each of their borders (FIG. 3). In contrast to a 2-dimensional grid, as explained in [Hurst 2000] or used to reference fields of a chess board and cells of a spreadsheet, we use a double topological grid structure with 4 dimensions ($\hat{x}1, \hat{y}1, \hat{x}2, \hat{y}2$) for each of the 4 cardinal directions of the visual plane: right, down, left, up. 320 shows a table that contains 6 visualized element nodes and their coordinates in the double topological grid. The four tables of 330 show the positional coordinates for each of the coordinates of the double topological grid. We found this data structure built upon 4 lists of lists to be very time-effective in the process of detecting structures on a non-perfect grid with partly overlapping or empty blocks, such as when neighboring boxes are not completely flush with each other. Also, the computational complexity of alternatively indexing structures such as visual adjacency multigraphs [Kovacevic et al, 2004] are higher, which translates into worse time performance. We refer to any particular choice of $(^\wedge x1, ^\wedge y1, ^\wedge x2, ^\wedge y2)$ on this grid with $^\wedge x1 < ^\wedge x2$ and $^\wedge y1 < ^\wedge y2$ as hyperBox.

Textual and Metadata Content of Logical Units of Information on the Visual Web Also, we observe that the textual content that is visible to the human observer (402, 404, 412, 414, 416) as confined within the boundaries of those visualized element nodes is not readily available in the parsed HTML source code or DOM tree. The text nodes that are children nodes of those element nodes often form only part of those textual content. Reasons may be that those element nodes contain other element nodes with respective text that is shown inside the boundary of the former element nodes.

We therefore determine the textual content of visualized element nodes by determining the coordinates of all text on the screen separately and determining whether or not any given text is contained with another visualized element node. To do so, we tokenize text into words and determine the bounding boxes of all words (434, 436, 444, 446, 448) separately. An alternative way would be to determine the bounding box of larger junks of text.

Also, for each visualized element node, a vector of visual parameters can be defined that expresses the visual appearance of this visualized element node on the screen. We refer to such information as metadata as it contains information about how textual information is arranged or displayed. This vector contains such information as background color of the visualized element node, text style, text size or text color. For some metadata such as text size, not just the metadata of the element node is used, but a function can be defined that maps the sum the metadata of all contained textual cells into one or more values for each visualized element node.

An alternative approach to determine most such textual content is by recursively traversing the parsed tree structure of the HTML code and including all text nodes that are lower in the hierarchy of the specific sub-tree. However, absolutely positioned element nodes which are not children of the former element nodes might be used to show textual content inside their borders on the screen.

Types of Spatially Structured Information in the Visual Web

The general approach to structured information extraction of this method is to focus on the 2-D visual representation of web pages as intended by authors for readers in the current Visual Web Explicit Semantic Web annotations are still rare and dynamic web technologies around Web 2.0 translate into an increasingly more complicated code syntax, but with more or less the same visual syntax used to express similar kind of human-understandable semantic relations. The source code carries the same amount of information, but in an implicit and difficult to analyze format. "Implicit" means that relations between individual items is not available without first fully analyzing and "executing" or rendering the code. And information (703) actually is the result of combining individual data items (701) together with relations between these data items (702). Using and decoding the available visual information after rendering a web page allows us to draw additional conclusions, thus filling the gap between available data and domain-dependent semantic relations.

Figure 7:
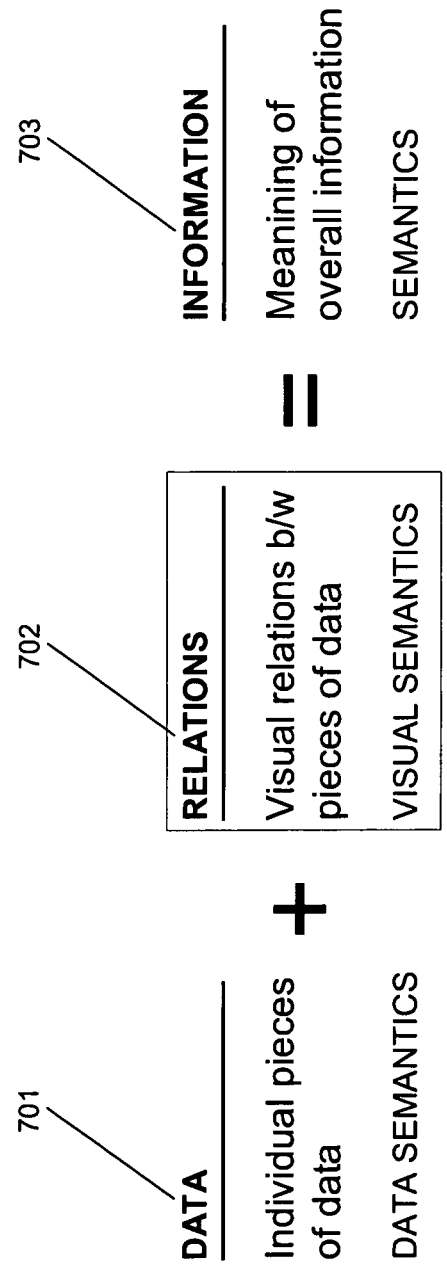
FIG. 7 illustrates the conceptual elements of spatially structured information FIG. 8 compares 4 types of tables on the Web.

Such visual semantic relations can be expressed in two principal syntactic ways: (1) By topology, which concerns the spatial arrangement of the composing units of information. (2) By typography or style, which concerns metadata information such as font size, font weight or background color. Here, we provide a broad characterization of the first subcategory: visually structured information that predominantly derives its meaning from the spatial arrangement of its constituent data items. FIG. 7 shows that in other words, the spatial relations (702) between individual elements (701) add some important metadata to the meaning of each data block, without which the information (703) cannot be understood to its full extent. Broadly, we find that web tables are, together with lists and some domain-specific aligned graphics, one of the three dominant topological data structures found on web pages. Our focus has been to classify the different phenomenon according to their intended purpose as visible to the human observer, not by their implementation, which vary for example for tables from <table> over <div> and <li> tables to tables in non-HTML format.

All three can be found either as one dominant structure with atomic data content (511) or with nested substructures (512). Below we give a set of definitions for these structures which helped us to develop human-like heuristics for our table extraction step, and which enable us to distinguish tables from similar visual structures. These definitions are best understood in connection with FIG. 5.

Tables (501): A web table is a two-dimensional presentation of logical relations between groups of data items. Those relations are reflected by different visual properties and by horizontal and vertical alignment of the data items in a visible or implied grid structure, which become observable after a web page is rendered.

Lists (502): A list is a series of similar data items or data records. A list can be either one-dimensional or two-dimensional; in both variants, no hierarchical or other semantic relationships in between individual list items is implied except for a possible ordering of the items.

Aligned graphics (503): Aligned graphics are such graphical depictions of relations between entities of a certain domain, which do not fall in either of the two other categories. They are generally domain-specific (like the period system for chemical elements), not necessarily bounded by a rectangle, and relative spatial positions do imply relationships between data items.

The structures described above often appear in nested forms. The data records of search engine results are an example of a list where the individual list items consist of repetitive substructures. The characterization looks at the dominant" structure, which is the principal structure that cannot be seen as a substructure of another table, list or other repetitive pattern. It is important to add that this nestedness does not necessarily imply nestedness in the source code. We only focus on the visual appearance of structures on rendered web pages, independent of their coding.

Implementations of Web Tables

Figure 8:
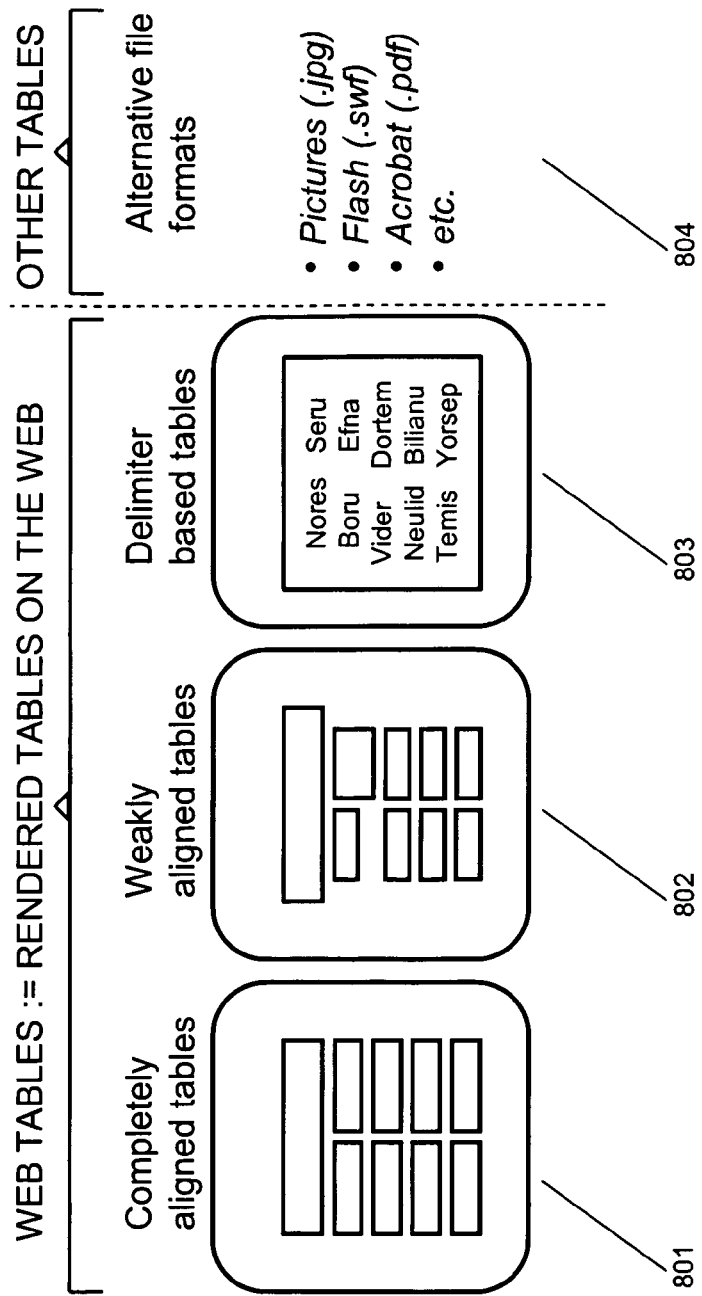

Our observation is that the majority of web tables topologically form a completely filled hyperBox in the visual box model. Completely filled refers to a situation when the area of the hyperBox can be covered with a subset of visualized element nodes in such a way that the whole area is covered and no visualized element node overlaps another one (MECE=Mutually Exclusive, Collectively Exhaustive)

except for the adjacency condition. FIG. 8 compares the topology of this kind of completely tiled and "completely aligned tables" (801) with the other three types of tables on the Web: web tables, whose logical cells are formed by visualized element nodes but which are not completely aligned (802, "weakly aligned tables"); web tables whose logical cells are not contained in different visualized element nodes but rather as delimited words inside the same visualized element node or (803, "delimiter based tables"); and tables which have no equivalent HTML code and which, as such, are not "constructed" by rendering in a web browser, e.g. flash and pdf tables or pictures of tables (804).

Table Extraction from the Visual Web

For the task of extracting web tables from web pages, this method proposes to (1) find the plurality of visualized element nodes for a given web page and determine their textual and metadata content; (2) find a set of subsets that individually can form a table according to some spatial conditions; (3) make use of metadata information of each visualized element node and its contained textual nodes to discern semantically significant from lists and other tabular but non-relational information; (4) transfer the content into a topological grid description in which logical cells are flush with neighboring cells and their spatial relations are explicit. The essential part of this method is that we start from visualized element nodes as possible logical units of information and in a later step determine their textual and metadata information.

In this embodiment of the method, we define tables as a set of visualized element nodes that are arranged on the screen in such a way that the area of a rectangle on the screen is completely covered and no visualized element node overlaps another one. The only exception is the adjacency condition of 3 pixel. With the previous list of table implementations, this embodiment focuses on completely aligned tables. In principle, the definition of table can be enlarged to include also weakly aligned tables.

In this embodiment of the method, we focus on a set of eight attributes for visualized element nodes (hname, color, bgcolor, fsize, fstyle, fweight, ffamily, textalign) and nine attributes for visualized words (hname, color, bgcolor, fsize, fstyle, fweight, ffamily, textalign, href) as metadata information. Other visual attributes can be added. We only consider visualized element nodes with certain names, which we found form the dominant number of logical table cells on the Web ("TD", "TH", "DIV"). The embodiment eliminates duplicates of visualized element nodes which have the same coordinates. Adjacency between neighboring visualized element nodes is loosely defined with a margin of 3 pixel.

Figure 9:
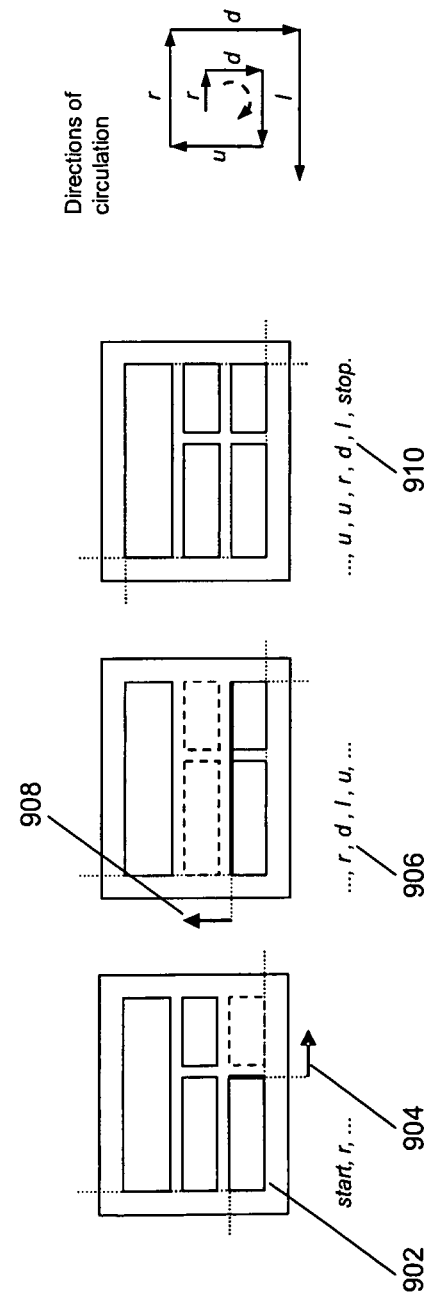
FIG. 9A to FIG. 9D illustrate the expansion algorithm.

One embodiment uses a tabular pattern recognition and extraction algorithm that is referred to as expansion algorithm. It is a recursive and circulating algorithm that tries to expand from all VENs on the double topological grid except for those that were part of a previous expansion step. Expansion into one direction is possible only if an adjacent hyperBox is completely tiled with a twin neighbor or several smaller neighbors and does not contain any element boxes introducing step neighbors. As such, an adjacent hyperBox must form a twin neighbor according to the 5 defined spatial relations (FIG. 6). In addition, it is not allowed to introducing any step neighbors (FIG. 6). The algorithm is circulating clockwise around the 4 cardinal directions of the visual plane (FIG. 9D: right, down, left, up) and stops when no expansion is possible any more. FIG. 9A, 9B, 9C illustrate the working of the expansion algorithm. Starting from a visualized element node 902, the algorithm tries to expand to the right (904). When it cannot expand any more, it changes directions (906) until it can expand again up (908). When it cannot expand anymore, it stops (910). Algorithm 1 is pseudocode of the algorithm that tries to expand from all nodes, Algorithm 2 shows the idea of the expansion step for one of the 4 directions.

Algorithm 1 LOCATEFRAMES($V_e$): locates all completely filled hyperboxes (= frame) of a web page that are not part of another, bigger frame Input: $V_e$: set of visualized element nodes of web page
Return: F: set of frames of web page
1: $V_e^* \leftarrow V_e$
2: $F \leftarrow \{\}$
3: for all $e \in V_e^*$ do
4:     frame $\leftarrow <x^e, \{e\}>$
5:     direction $\leftarrow 0$
6:     fail $\leftarrow 0$
7:     repeat
8:         repeat
9:             <frame, expandSuccess> $\leftarrow$ EXPAND(direction, frame)
10:           if (expandSuccess = true) fail $\leftarrow 0$ else fail $\leftarrow +1$
11:         until expandSuccess = false
12:         direction = (direction + 1) mod 4
13:     until fail = 4
14:     $V_e^* \leftarrow V_e^* - V_e^{frame}$
15:     $F \leftarrow F \cup V_e^{frame}$
16: end for
17: return hList Algorithm 2 EXPANDRIGHT(hBox): tries to expand a given hyperBox to the right by one additional hyperBox Input: hBox:hyperBox
Return: <expandResult:hyperBox, expandSuccess:boolean>
1: candidateList $\leftarrow$ list of upper aligned and right adjacent boxes of hBox
2: for all candidate $\in$ candidateList do
3:     if candidate = TwinNeighbor(hBox) then
4:         return <Union(hBox, candidate), true>
5:     else if candidate = SmallerNeighbor(hBox) then
6:         tempHBox $\leftarrow$ candidate
7:         repeat
8:             <tempHBox,tE> $\leftarrow$ EXPANDDOWN(tempHBox)
9:             if tempHBox = TwinNeighbor(hBox) then
10:                return <Union(hBox, tempHBox), true>
11:             end if
12:         until tempHBox = BiggerNeighbor(hBox) $\vee$ tE = false
13:     end if
14: end for
15: return <hBox, false>

In one aspect the method includes determining metadata information for each of the visualized element node. The visualized element node has a corresponding textual content. The metadata information is complete metadata information or abstracted metadata information. Relative spatial arrangement of the visualized element node and the metadata information corresponding to the visualized element node is used to distinguish a semantically relevant table from other tabular information in the web source.

In another aspect the method includes using relative spatial arrangement of the visualized element node and the metadata information corresponding to the visualized element node to interpret the semantically relevant table. It should be noted that, while the current embodiment has chosen a specific expansion sequence, any other one could be chosen as well. Alternatively, the directions of expansion could be changed into expanding into several direction in each step and comparing different results.

It should also be noted that while the current embodiment focuses only on completely aligned tables, a further relaxation of the alignment conditions (similarly to the relaxation of the adjacency condition) would provide a straight-forward generalization of the method described herein.

Given candidate tabular information is found, several heuristics are applied to distinguish semantically relevant tables, which are such that conform to the definition of web tables, from other tabular information. One heuristic is a cleaning algorithm (Algorithm 3) which deletes empty cells from the structure that convey just layout and no semantic meaning and as such just deletes cells whose disappearance does not change the visual semantic relations in a table.

---

Algorithm 3 CLEAN(f): purges empty spacer columns
and rows from a frame and candidate table f

---

Input: $V_e^f$: set of visualized element nodes that form f
Return: $V_e^f$: cleaned set
1: construct double topological grid X for $V_e^f$
2: for all $x_1^* \in X_1$ do
3:   if all VENs with $x_1 = x_1^*$ are empty ∧have same $x_2^*$ then
4:     delete these VENs from frame
5:   end if
6: end for
7: for all $y_1^* \in Y_1$ do
8:   if all VENs with $y_1 = y_1^*$ are empty ∧have same $y_2^*$ then
9:     delete these VENs from frame
10:   end if
11: end for
12: return $V_e^f$

---

Figure 10:
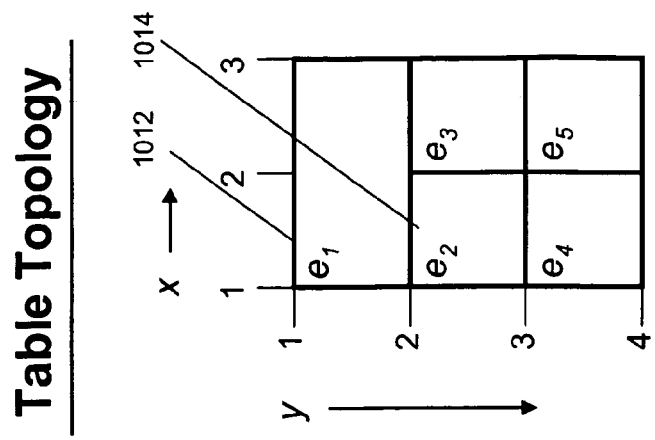
FIG. 10 illustrates the closing algorithm.
Figure 10:
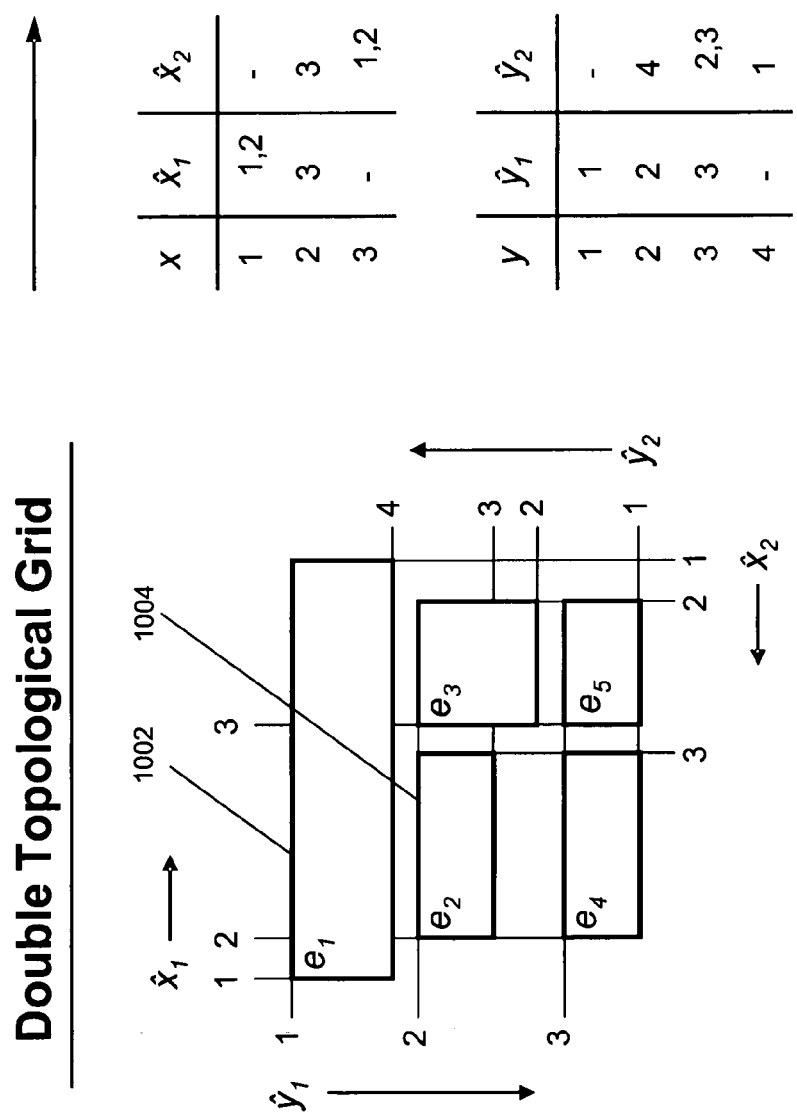

The result of this step is a structure with partial holes. FIG. 10 illustrates that with example visualized element nodes 1002 and 1004. In the current embodiment, another algorithm (Algorithm 4) that works on the double topological grid closes the structure again. The result of this step is again a set of completely filled hyperBoxes, which still do not necessarily represent tables. As example, in the new representation the original visualized element nodes 1002 and 1004 are now flush and completely aligned (1012 and 1014).

---

Algorithm 4 AlignX: combines coordinates $\hat{x}_1$ and $\hat{x}_2$
of the double topological cell grid into coordinate table
list X of the topological table model

---

Input: $\hat{x}_1, \hat{x}_2$
Return: X = table list of $((\hat{x}_{1(k)},...),(\hat{x}_{2(m)},...))$
1: Construct ordered list l of entries from $\hat{x}_1$ and $\hat{x}_2$
2: i,j ← 1
3: repeat
4:   repeat
5:     X(i,1) ← +l(j)
6:     j ← +1
7:   until l(j) ∈ $\hat{x}_2$
8:   repeat
9:     X(i,2) ← +l(j)
10:     j ← +1
11:     if endof(l) then BREAK
12:   until l(j) ∈ $\hat{x}_1$
13:   i ← +1
14: until BREAK
15: return X

---

The current embodiment applies further heuristic rules to discriminate semantically relevant from non-relevant tabular information. In addition to previously mentioned rules in the literature (Wang and Hu, 2002), those rules can also make not only of textual content, but also metadata of visualized element nodes, such as area and color.

The output of these steps is the logical table model of the found tables. The logical table model is the explicit representation of the spatial relations between the logical cells of a table.

Figure 11:
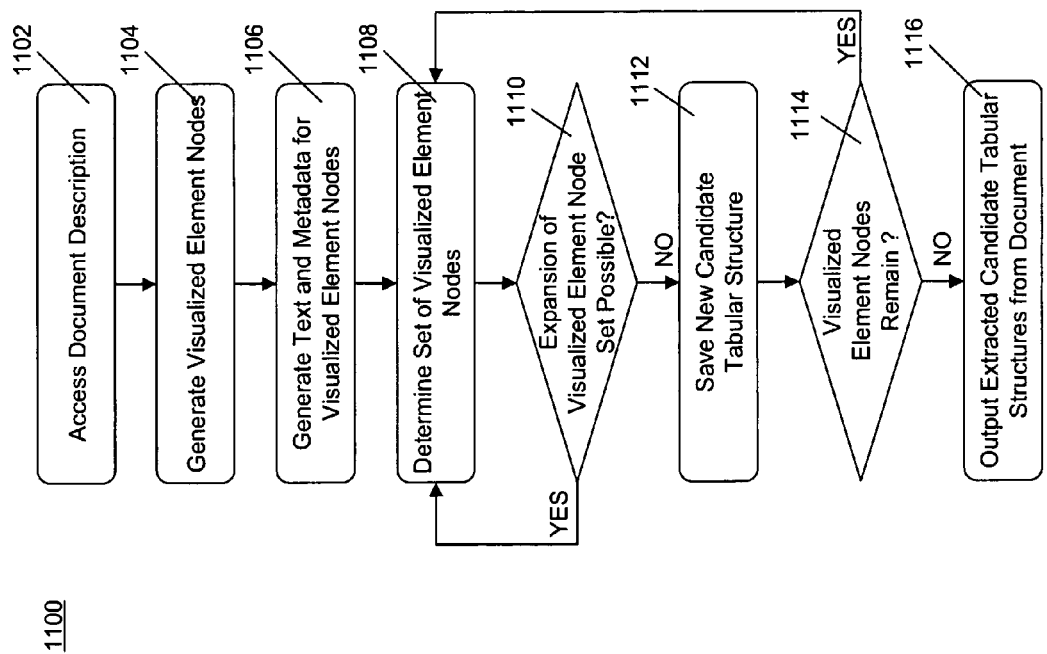
FIG. 11 is a flowchart illustrating an example process 1100 for performing Vision-Based Table Extraction. Process 1100 is implemented by Vision-Based Table Extraction Module 102 of FIG. 1, and may be performed in software, firmware, hardware, or combination thereof.

FIG. 11 provides a flowchart illustrating an example process 1100 for performing Vision-Based Table Extraction. Process 1100 is implemented by Vision-Based Table Extraction Module 102 of FIG. 1, and may be performed in software, firmware, hardware, or combinations thereof.

Initially, a document description is accessed (act 1102). This document description is, for example, a DOM tree for an HTML web page. With the document description, visualized element nodes in the document are identified (act 1104), and textual content and additional metadata of the visualized element nodes are generated (act 1106). One or more visualized element nodes and their textual and metadata are chosen (act 1108). Expansion of those visualized element nodes in any of 4 directions (right, down, left, up) is tested (act 1110) and if possible a new set of visualized element nodes is created (act 1108). If no expansion is possible (act 1110), then the current set of visualized element nodes is saved (act 1112) and it is tested if visualized element nodes can still be used to detect further tabular structures (act 1114). If positive, then a new subset of this visualized element nodes is created and process 1100 returns to act 1108. If negative, then all extracted candidate tabular structures are output.

Thus, it can be seen that the vision-based table extraction employs a bottom-up approach. Generally, an initial set of visualized element nodes are identified and grown in such a way that the grown set of visualized element nodes can possibly be a semantically relevant table (herein referred to as candidate table as the semantically relevance is not yet determined).

As discussed herein, the documents being used are assumed to be rectangular in shape when displayed. Thus, some sizes, dimensions, areas, and so forth are described herein with reference to a rectangular or Cartesian coordinate system (e.g., an X,Y-coordinate system). It is to be appreciated that these are only examples, and that the rectangular shapes and the coordinate systems can be different. In some instances, if non-rectangular shapes (e.g. non-convex polygons) are used they are converted to rectangular shapes prior to performing the vision-based table extraction. In other instances, the processes and techniques described herein are adapted to use these different shapes and/or coordinate systems.

Table Interpretation from the Visual Web

Interpreting a table is equal to determining the reading order of a table. The reading order determines the way in which information is read by humans from a table. An alternative formulation is that interpreting a table is the same as determining its schema. The described method allows to interpret tables using metdata features that are not available to previously described approaches of table interpretation. Those visual clues are used by humans to interpret the reading order of tables according to visual rules which can be encoded to be followed by an automatic program. The important new possibility that the described method allows, is using such calculated metadata of visualized element nodes, which are not explicit in the source code of web pages, to interpret tables.

One embodiment of the method defines a number of most commonly found schema types according to this metadata and classifies a given extracted table and its metadata accordingly.

In a logical next step, the extracted and interpreted tables as by the above described method can be further analyzed and compared. As such, in one application scenario said method can be used to automatically create structured databases from the Web. In an alternative scenario, the extracted information can be used in conjunction with a retrieval system and rank documents in response to a query given by a user.

In general, whereas before the extraction and optional interpretation, the information contained in web tables was not available to machine processing, the newly explicit representation allows for automated processing of that information and using it for further value-added services.

What is claimed is:

1. A method for automatically recognizing tabular structure in a web page and extracting the tabular structure into an explicit logical table model and distinguishing a semantically relevant table from other tabular structures in said web page in a computer comprising:
   determining a plurality of positional coordinates for a plurality of visualized element nodes in the webpage, where the positional coordinates represent spatial relations between said plurality of visualized element nodes;
   determining a subset of said plurality of visualized element nodes based on said plurality of positional coordinates which forms a candidate tabular structure, wherein each of said subset of said plurality of visualized element nodes forms a logical cell of said candidate tabular structure;
   determining a plurality of textual content in the web page;
   determining metadata information for each of said visualized element node of said candidate tabular structure, wherein each said visualized element node has a corresponding textual content, and wherein said metadata information is selected from a group consisting of complete metadata information or abstracted metadata information;
   matching said textual content to said visualized element nodes forming said logical cells of said candidate tabular structure;
   transforming said candidate tabular structure into an explicit logical table model of relative two-dimensional spatial relations between at least two of said logical cells, using relative spatial relations between said visualized element nodes, and said metadata information corresponding to said visualized element nodes to distinguish a semantically relevant table from other tabular structures in said webpage; and
   saving said explicit logical table model in a structured document format,
   wherein the method is performed automatically by the computer.

2. The method of claim 1, further comprising:
   using relative spatial relations between said visualized element nodes and said metadata information corresponding to said visualized element nodes to interpret the semantically relevant table.

3. A computer program product, including non-transitory computer readable media comprising instructions, the instructions being capable of implementing a process on a computer for recognizing tabular structures in a web page and extracting this tabular structure into an explicit logical table model and distinguishing a semantically relevant table from other tabular structures in said web page, wherein the process comprises:
   instructions for performing a process for recognizing and extracting tabular structures from the webpage, wherein the process comprises:
   determining a plurality of positional coordinates for a plurality of visualized element nodes in the webpage;
   determining a subset of said plurality of visualized element nodes based on said plurality of positional coordinates to obtain a candidate tabular structure, wherein each of said subset of said plurality of visualized element nodes forms a logical cell of said candidate tabular structure;
   determining a plurality of textual content in the web page;
   determining metadata information for each of said visualized element node of said candidate tabular structure, wherein each said visualized element node has a corresponding textual content, and wherein said metadata information is selected from a group consisting of complete metadata information or abstracted metadata information;
   matching said textual content to said visualized element nodes forming said logical cells of said candidate tabular structure;
   transforming said candidate tabular structure into an explicit logical table model of relative two-dimensional spatial relations between at least two of said logical cells, using relative spatial relations between said visualized element nodes, and said metadata information corresponding to said visualized element nodes to distinguish a semantically relevant table from other tabular structures in said webpage; and
   saving said explicit logical table model in a structured document format,
   wherein the method is performed automatically by the computer.

* * * * *